(12) United States Patent
Seki

(10) Patent No.: US 11,531,862 B2
(45) Date of Patent: Dec. 20, 2022

(54) LEARNING DEVICE, ESTIMATING DEVICE, LEARNING METHOD, AND COMPUTER PROGRAM PRODUCT

(71) Applicant: KABUSHIKI KAISHA TOSHIBA, Tokyo (JP)

(72) Inventor: Akihito Seki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 16/548,550

(22) Filed: Aug. 22, 2019

(65) Prior Publication Data
US 2020/0151540 A1   May 14, 2020

(30) Foreign Application Priority Data

Nov. 13, 2018 (JP) .............................. JP2018-213008

(51) Int. Cl.
*G06E 1/00* (2006.01)
*G06N 3/04* (2006.01)
*G06K 9/62* (2022.01)

(52) U.S. Cl.
CPC .............. *G06N 3/04* (2013.01); *G06K 9/628* (2013.01); *G06K 9/6215* (2013.01)

(58) Field of Classification Search
CPC ........ G06N 3/04; G06N 3/084; G06K 9/6215; G06K 9/628; G06K 9/6262; G06K 9/6271; G06V 20/10; G06V 20/58
See application file for complete search history.

(56) References Cited

U.S. PATENT DOCUMENTS

| | | | |
|---|---|---|---|
| 10,176,198 B1* | 1/2019 | Dhua | G06V 10/454 |
| 10,572,800 B2* | 2/2020 | Wang | G06N 3/08 |
| 2018/0255283 A1* | 9/2018 | Li | G06K 9/6267 |
| 2019/0213481 A1* | 7/2019 | Godard | G06T 7/50 |

FOREIGN PATENT DOCUMENTS

JP         2017-207874 A      11/2017

OTHER PUBLICATIONS

Kendall et al., "End-to-End Learning of Geometry and Context for Deep Stereo Regression", International Conference on Computer Vision, 2017, pp. 66-75.

(Continued)

*Primary Examiner* — Dhaval V Patel
(74) *Attorney, Agent, or Firm* — Knobbe, Martens, Olson & Bear LLP

(57) ABSTRACT

A learning device includes one or more processors. The processors calculate a likelihood of belonging to a plurality of estimated classes, of learning data, by using an estimation model for estimating to which of the estimated classes input data belongs. The processors calculate a weight of a loss function to be used in learning the estimation model such that, when a likelihood of a first class that is closer to correct data than other estimated classes among the estimated classes and likelihoods of a second class and a third class that are adjacent to the first class are applied to a function having a predetermined shape, a position that has an extreme value of the function corresponds to the correct data. The processors learn the estimation model by using the loss function.

13 Claims, 9 Drawing Sheets

(56) References Cited

OTHER PUBLICATIONS

Luo et al., "Efficient Deep Learning for Stereo Matching", International Conference on Computer Vision and Pattern Recognition, 2016, pp. 1-9.

Seki et al., "SGM-Nets: Semi-global matching with neural networks", International Conference on Computer Vision and Pattern Recognition, 2017, pp. 231-240.

* cited by examiner

FIG.10
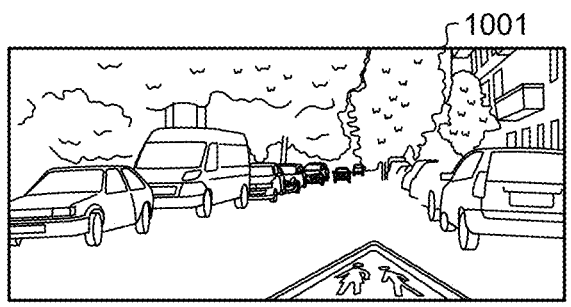
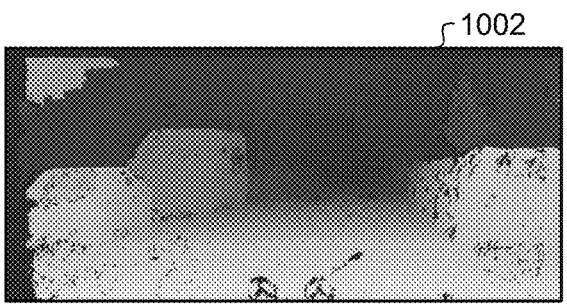
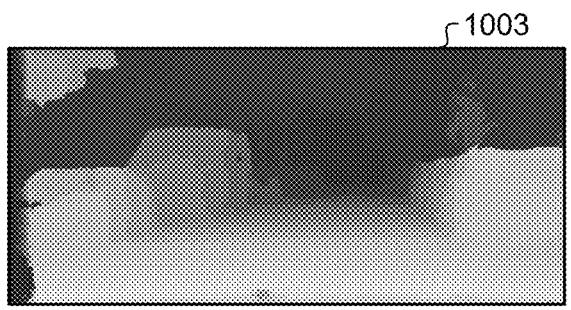
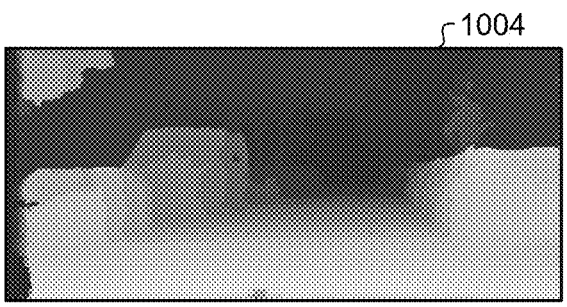
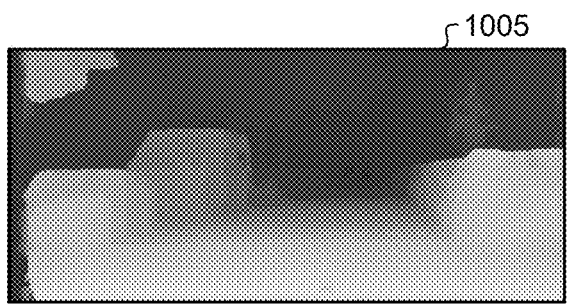
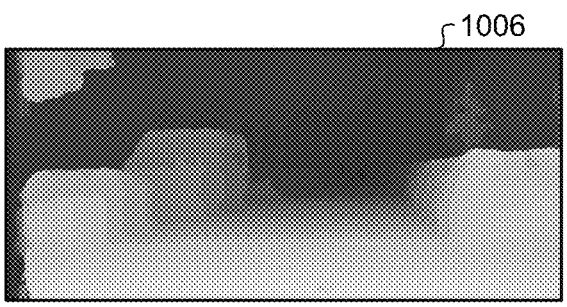
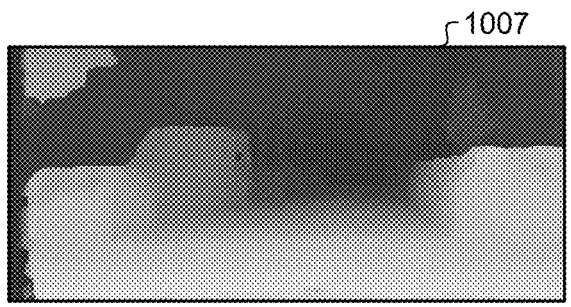
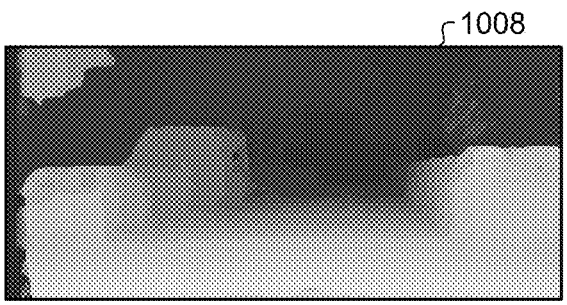

LEARNING DEVICE, ESTIMATING DEVICE, LEARNING METHOD, AND COMPUTER PROGRAM PRODUCT

CROSS-REFERENCE TO RELATED APPLICATIONS

This application is based upon and claims the benefit of priority from Japanese Patent Application No. 2018-213008, filed on Nov. 13, 2018; the entire contents of which are incorporated herein by reference.

FIELD

Embodiments described herein relate generally to a learning device, an estimating device, a learning method, and a computer program product.

BACKGROUND

A technique has been known of obtaining, for each pixel within a stereo image, corresponding positions among stereo images, and obtaining a depth in accordance with the principle of triangulation. Information on depths obtained in such technique has a wide range of use. For example, in automatic driving of an automobile, an obstacle can be extracted by obtaining a depth from an image taken with a camera installed in the automobile, and this can be utilized for control of running of the automobile.

In addition, a technique has been proposed of assigning a class to each of predetermined depth intervals and estimating a depth by estimating a class using an estimation model expressed by, for example, a deep neural network.

However, in conventional techniques, there are cases where a class cannot be estimated with high accuracy.

BRIEF DESCRIPTION OF THE DRAWINGS

FIG. 10 is a figure illustrating an example of an estimated result of a disparity from a stereo image.

DETAILED DESCRIPTION

Figure 1:
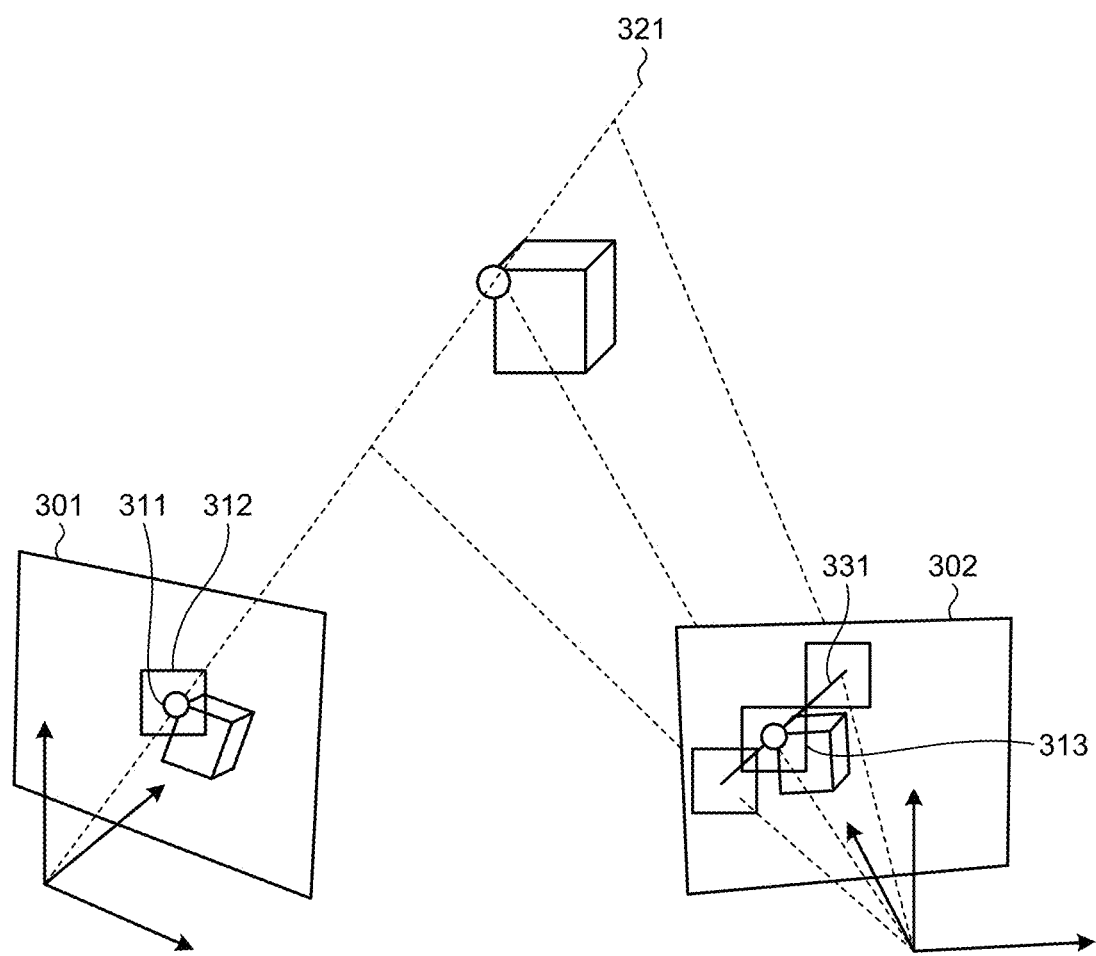
FIG. 1 is a figure explaining depth estimation using a stereo image.

According to one embodiment, a learning device includes one or more processors. The processors calculate a likelihood of belonging to a plurality of estimated classes, of learning data, by using an estimation model for estimating to which of the estimated classes input data belongs. The processors calculate a weight of a loss function to be used in learning the estimation model such that, when a likelihood of a first class that is closer to correct data than other estimated classes among the estimated classes and likelihoods of a second class and a third class that are adjacent to the first class are applied to a function having a predetermined shape, a position that has an extreme value of the function corresponds to the correct data. The processors learn the estimation model by using the loss function.

Preferable embodiments of a learning device will now be described in detail with reference to the accompanying drawings.

The following two methods have been proposed regarding a loss function to be used in learning of a deep neural network for estimating a depth (Non-patent Literature 1: W. Luo et al., Efficient Deep Learning for Stereo Matching, International Conference on Computer Vision and Pattern Recognition, 2016).

Cross entropy loss: a certain weight is set for a label having a depth closest to the true depth.

Soft cross entropy loss: certain weights are set for a label having a depth closest to the true depth, and its surrounding.

The true depth is, for example, a depth that is given as correct data at the time of learning. In these methods, although a class closest to the true depth is estimated, depths positioned between classes are not estimated. For example, when three depth classes, 10 m, 20 m, and 30 m, are set, only one of these three depth classes (10 m, 20 m, or 30 m) is output as an estimated result. On the other hand, for example, a class (intermediate class, sub-class) corresponding to an intermediate among the three depth classes such as 11.5 m is not estimated.

Accordingly, estimation accuracy depends on the number of classes, and preparation of numerous classes is required to estimate high accuracy. However, preparing learning data for a large number of classes is difficult, and realizing large classes may not be easy due to increase of the scale of a neural network.

As another method, a technique of using the combination of a soft-argmin layer and an L1 loss for estimating a depth of an intermediate class has been proposed (Non-patent Literature 2: A. Kendall et al., End-to-End Learning of Geometry and Context for Deep Stereo Regression, International Conference on Computer Vision, 2017). However, in this technique, there is no guarantee that dissimilarities become low in the surrounding of the true depth. In addition, in such technique, regularization as shown in Non-patent Literature 3 (Seki et al., SGM-Nets: Semi-global matching with neural networks, International Conference on Computer Vision and Pattern Recognition, 2017), cannot be performed.

A dissimilarity is a value expressing the degree of a difference between input data and each class. The dissimilarity is an example of a scale (likelihood) expressing a possibility of belonging to each class, of the input data. Other examples of the likelihood include similarities, which indicate the degree of likeness between input data and each class.

The depth estimation using a stereo image will be further described with reference to FIG. 1. A case in which there are two images 301, 302 having different viewpoints, and in which a depth in a pixel 311 on the image 301 is estimated, will be described as an example. The depth of the pixel 321 is positioned on a ray of light 321. Thus, a position corresponding to the pixel 311 is obtained from an epipolar line 331, which is the ray of light 321 projected on the image 302.

When not using a neural network, a small region 312 is set in the surrounding of the pixel 311, and a similar pattern is searched from the image 302, thereby obtaining a small region 313 within the image 302.

When using a neural network, instead of the small region, a feature is calculated for each pixel, and a depth is estimated using the feature. Searching among the image 302 is normally performed in pixel units. Accordingly, if each one of pixels to be searched is regarded as a class, depth estimation can be handled as a multi-class problem.

A difference (e.g., a number of pixels) in positions between similar pixels corresponds to a disparity, and the disparity can be converted into a depth in accordance with the principle of triangulation. Accordingly, for example, estimation of a class representing a disparity (number of pixels) is equivalent to estimation of a depth class.

In order to accurately estimate a depth, there is a need of obtaining a corresponding position in sub-pixel units. For example, in a technique not using a neural network, dissimilarities between small regions are obtained using Sum. of Absolute Difference (SAD), Sum of Squared Difference (SSD), and the like, and if a disparity value of a sub-pixel level less than one pixel is required, estimation is performed using an equiangular line or parabola curve. Meanwhile, when using a neural network, only a learning method in class units is disclosed. Thus, a class cannot be estimated in sub-pixel units.

First Embodiment

A learning device according to a first embodiment learns an estimation model such that a class can be estimated in sub-class units (e.g., sub-pixel units). As a result, a sub-class corresponding to an intermediate class of estimated classes that are set in advance as targets for which the estimation model outputs likelihoods, can be estimated. That is to say, a class can be estimated with higher accuracy. In the following, explanations are made by taking estimation of a disparity (estimation of a depth) using a stereo image as an example. However, similar procedures are also applicable to class estimation other than disparity estimation.

Figure 2:
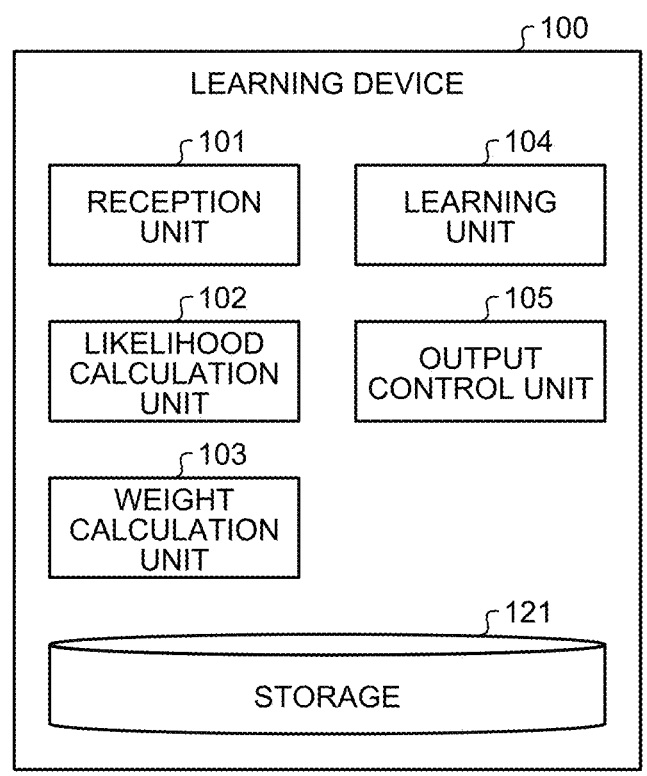
FIG. 2 is a block diagram of a learning device according to a first embodiment.

FIG. 2 is a block diagram showing a configuration example of a learning device 100 according to the first embodiment. As illustrated in FIG. 2, the learning device 100 includes a reception unit 101, a likelihood calculation unit 102, a weight calculation unit 103, a learning unit 104, an output control section 105, and storage 121.

The storage 121 stores therein various kinds of data used for various kinds of processing by the learning device 100. For example, the storage 121 stores therein variables (parameters) that define an estimation model used for estimation processing. The estimation model is, for example, a model expressed by a neural network (such as a deep neural network). The estimation model is not limited to the model expressed by the neural network. Any model may be employed as long as the model can estimate to which class among a plurality of estimated classes input data belongs.

The storage 121 can be made of various storage media that are generally available such as flash memory, memory cards, random access memory (RAM), hard disk drive (HDD), and optical disks.

The reception unit 101 receives inputs of various kinds of data to be used for various kinds of processing by the learning device 100. For example, the reception unit 101 receives an input of learning data to be used for learning processing. When estimating a disparity class (depth class) from a stereo image, the reception unit 101 receives inputs of, for example, a stereo image and correct data including the true disparity (depth) for each pixel.

The likelihood calculation unit 102 uses the estimation model to calculate, for each of a plurality of estimated classes, a likelihood (e.g., dissimilarities) of belonging to the estimated classes, of input data (including the learning data). A neural network used for estimation of a class can be configured such that data is input, and a likelihood for each of the estimated classes is output. The likelihood calculation unit 102 calculates likelihoods using such neural network, for example.

The weight calculation unit 103 calculates a weight of a loss function to be used in learning of the estimation model. More specifically, the weight calculation unit 103 calculates the weight of the loss function such that, when a likelihood of a class (first class) closer to correct data than other estimated classes among the estimated classes and likelihoods of two or more classes (second class and third class) adjacent to this class are applied to a function having a predetermined shape, a position that has an extreme value of the function corresponds to the correct data. Details of the calculation method of the weight will be described below.

The learning unit 104 learns the estimation model using the loss function. For example, the learning unit 104 calculates a loss by using the likelihood calculated for the learning data and the loss function, in which the weight calculated by the weight calculation unit 103 is applied, and learns the estimation model so as to minimize the calculated loss. When using a neural network as the estimation model, the learning unit 104 can learn the neural network by using a learning method such as an error backward propagation method.

The output control unit 105 controls output processing of data with respect to an external device. For example, the output control unit 105 outputs data (such as parameters) related to the learned estimation model to a device that executes estimation processing with the estimation model.

The above-described respective units (the reception unit 101, the likelihood calculation unit 102, the weight calculation unit 103, the learning unit 104, and the output control unit 105) are realized with, for example, one or more processors. For example, the above-described respective units may be realized by causing a processor such as a central processing unit (CPU) to execute a computer program, i.e., by software. The above-described respective units may be realized by a processor such as a dedicated integrated circuit (IC), i.e., by hardware. The above-described respective units may be realized by using software and hardware in combination. When using a plurality of processors, each of the processors may realize one of the respective units, or may realize two or more of the respective units.

Figure 3:
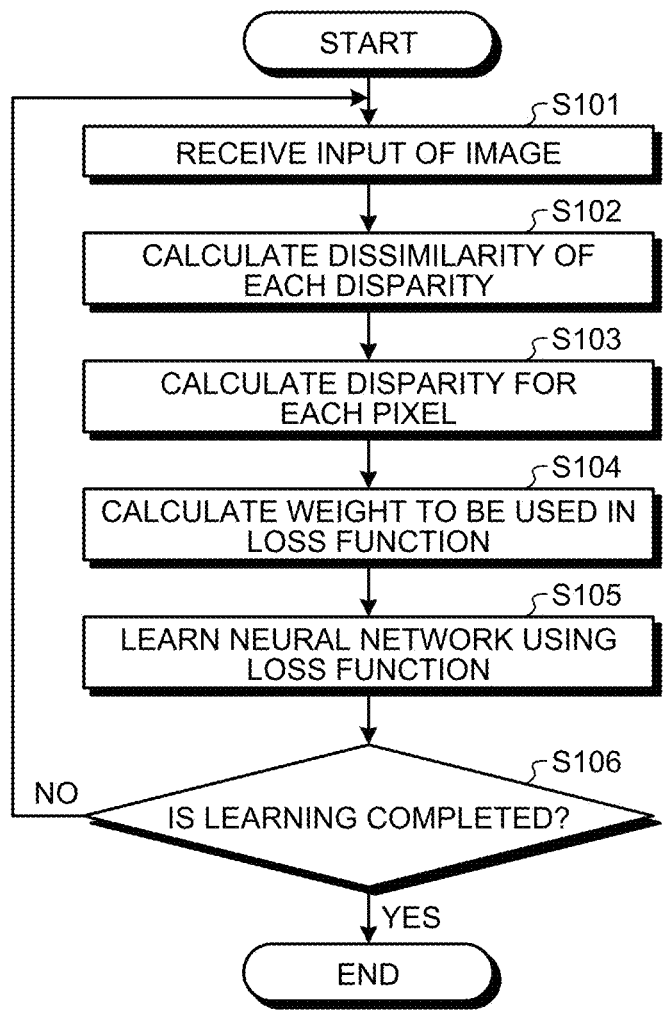
FIG. 3 is a flow chart of learning processing according to the first embodiment.

The following describes learning processing by the learning device 100 according to the first embodiment configured in such manner. FIG. 3 is a flow chart showing an example of the learning processing according to the first embodiment.

The reception unit 101 receives inputs of a stereo image and a true value of a disparity (depth) of each pixel (Step S101). The true depth may be obtained with, for example, a 3D sensor such as laser imaging detection and ranging (LiDAR). In addition, the true depth can be converted into a disparity using an internal parameter and an external parameter of a camera. The true value of the disparity calculated in this manner is generally expressed with fractional precision.

Then, the likelihood calculation unit 102 inputs the received stereo image to an estimation model such as a neural network, and calculates a likelihood (dissimilarity) for each disparity (Step S102). The likelihood calculation unit 102 can calculate the likelihood using, for example, a neural network as shown in Non-patent Literature 2. However, although the neural network shown in Non-patent Literature 2 includes a soft argmin layer at the end, this layer is unnecessary in the present embodiment. In this manner, the dissimilarity of each disparity can be calculated in each pixel.

When the neural network is correctly learned, the lowest dissimilarity is output with a correct disparity. When the neural network outputs a similarity as the likelihood, the highest similarity is output with the correct disparity. That is to say, it can be construed that dissimilarities=−similarities.

As described above, although a disparity that is finally estimated may be correct in the soft argmin layer of Non-patent Literature 2, the lowest dissimilarity is not necessarily shown with the correct disparity. For example, when disparity 50 is the correct disparity, there is no problem if the dissimilarity becomes 1 in disparity 50, and 0 in others. However, in the method of Non-patent Literature 2, the dissimilarity may be 0.5 in each of disparity 25 and disparity 75. Thus, it cannot be uniquely determined which one is the correct disparity.

Then, the learning unit 104 calculates a disparity for each pixel (Step S103). When the true value of the disparity is expressed with fractional precision as described above, the learning unit 104 calculates a disparity with integral precision closest to the true value of the disparity. For example, the learning unit 104 can calculate the disparity with integral precision by rounding off the disparity with fractional precision. The calculation of the disparity with integral precision corresponds to obtaining a disparity class closest to the true value of the disparity among disparity classes estimated with the estimation model. That is to say, in this step, the learning unit 104 specifies the closest class for a true value having the possibility of having sub-classes. Accordingly, if the class corresponding to the disparity is not one pixel unit but is, for example, 10 pixel units, the learning unit 104 obtains the class closest to the true value of the disparity from a disparity class of 10 pixel units rather than rounding off the true value of the disparity.

Then, the weight calculation unit 103 calculates a weight of a loss function to be used for learning of the neural network (Step S104). The calculation method of the weight differs depending on a function to be used for application. Details of the calculation method of the weight will be described later.

Then, the learning unit 104 uses the loss function in which the calculated weight is set to calculate a loss for learning data, and learns the neural network so as to minimize the calculated loss (Step S105). The learning unit 104 learns the neural network by, for example, an error backward propagation method in which the calculated loss is the error.

The learning unit 104 determines whether the learning has been completed (Step S106). The learning unit 104 determines the completion of the learning by, for example, determining whether the number of times of learning has reached an upper limit, or whether the level of improvement of the loss has become smaller than a threshold.

When the learning has not been completed (No at Step S106), the process returns to Step S101 and processing will be repeated with respect to new learning data. When the learning is determined to be completed (Yes at Step S106), the learning processing will be completed.

With such learning processing, parameters of the neural network are determined. By using the neural network expressed by the determined parameters, a class can be estimated in sub-class units. For example, at the time of estimation of a disparity class, the disparity class can be estimated in sub-pixel units.

The following describes two calculation methods of a weight, i.e., when the shape of a parabola curve ((F1) below) is used as the shape of a function for application, and when the shape of an equiangular line ((F2) below) is used as the shape of a function for application.

Before describing the calculation methods of a weight, the cross entropy loss and the soft cross entropy loss disclosed in Non-parent Literature 1 will be explained.

Figure 4:
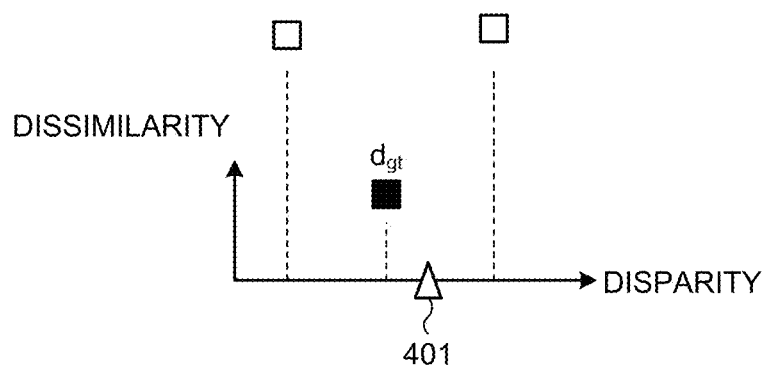
FIG. 4 is a figure illustrating a relation between disparities and dissimilarities.

As shown in the following formula (1), a cross entropy loss $E_{ce}$ is an integrated value that is obtained by multiplying logarithms of a weight p(x) and a dissimilarity σ(x) with a class of a label x. p(x) is 1 in the true class, and is 0 in others. FIG. 4 is a figure illustrating a relation between disparities and dissimilarities when using the cross entropy loss. $d_{gt}$ represents a disparity closest to the true value 401. In the cross entropy loss, weight "1" is set only for the disparity $d_{gt}$.

$$E_{ce} = -\sum_{x} p(x) \log \sigma(x) \qquad (1)$$

In the soft cross entropy loss, p(x) of the formula (1) is calculated as in the following formula (2).

$$p(x) = \begin{cases} \lambda_1 & d = d_{gt} \\ \lambda_2 & \text{if } |d - d_{gt}| = 1 \\ \lambda_3 & \text{if } |d - d_{gt}| = 2 \\ 0 & \text{otherwise} \end{cases} \qquad (2)$$

Figure 5:
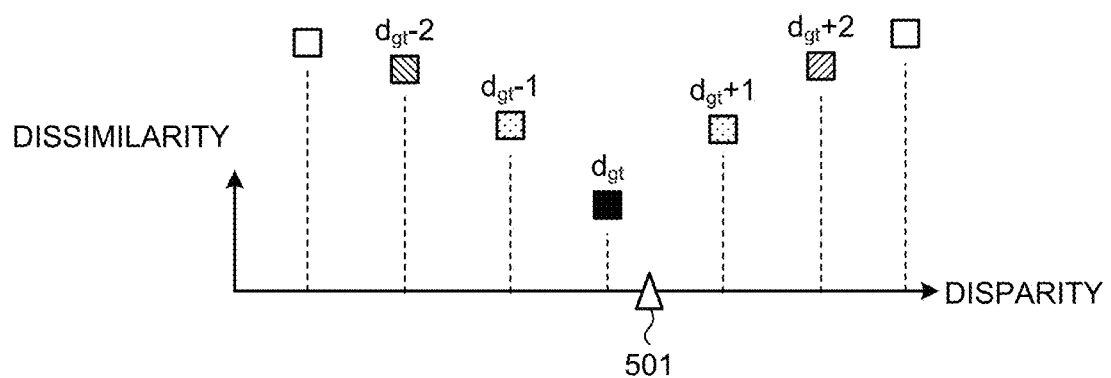
FIG. 5 is a figure illustrating a relation between disparities and dissimilarities.

In the example of the formula (2), weights are set for a total of five disparities, i.e., the disparity $d_{gt}$, which is the closest to the true value, disparities $d_{gt}\pm 1$, which are values next to the true value, and disparities $d_{gt}\pm 2$, which are two values away from the true value. Specifically, as the weight p(x), λ1 is set for the disparity $d_{gt}$, λ2 is set for the disparities $d_{gt}\pm 1$, and λ3 is set for the disparities $d_{gt}\pm 2$. FIG. 5 is a figure illustrating a relation between disparities and dissimilarities when using the soft cross entropy loss.

In Non-patent Literature 1, λ1, λ2, and λ3 are 0.5, 0.2, and 0.05, respectively. In this manner, in Non-patent Literature 1, certain weights are set based on the disparity $d_{gt}$ closest to the true value. Accordingly, even if a parabola curve or equiangular line is applied to dissimilarities as in the case of the present embodiment, the disparity $d_{gt}$ closest to the true value 501 is estimated as a value having an extreme value. Thus, it is not possible to estimate the true value itself positioned at a sub-class.

(F1) In the Case of the Parabola Curve

Figure 6:
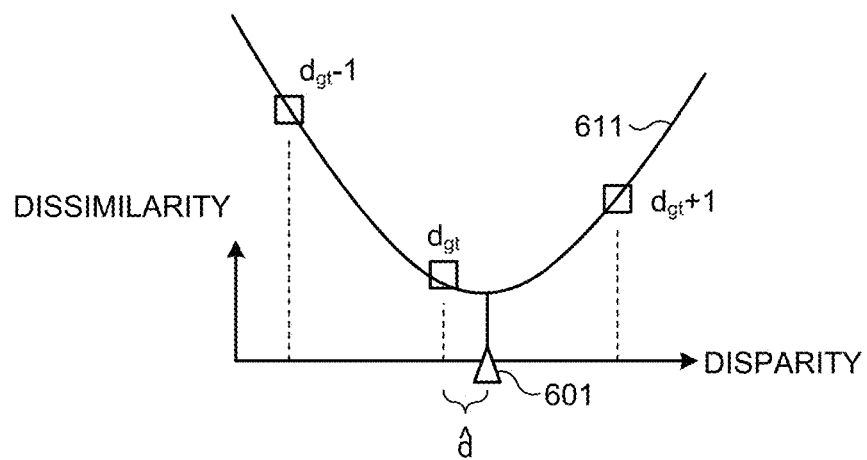
FIG. 6 is a figure illustrating an example of a parabola curve.

A case in which a parabola curve is used as a function for application will be described. FIG. 6 is a figure illustrating an example of the parabola curve, for which application is performed. As illustrated in FIG. 6, when a parabola curve 611 is applied to the dissimilarities of the disparity $d_{gt}$ closest to a true value 601, and the disparity $d_{gt}+1$ and the disparity $d_{gt}-1$ adjacent thereto, a deviation d^ from the disparity $d_{gt}$ closest to the true value 601 to the true value 601 can be obtained by the following formula (3).

$$\hat{d} = \frac{\sigma(d_{gt}-1) - \sigma(d_{gt}+1)}{2\sigma(d_{gt}-1) - 4\sigma(d_{gt}) + 2\sigma(d_{gt}+1)} \quad (3)$$

The weight calculation unit 103 calculates the weight p(x) of the formula (1) according to the following formula (4) such that the dissimilarities output with the neural network become the shape of a parabola curve in the surrounding of the class closest to the true value.

$$p(x) = \begin{cases} \beta - \alpha(1+\hat{d})^2 & \text{if } d = d_{gt}-1 \\ \beta - \alpha\hat{d}^2 & \text{if } d = d_{gt} \\ \beta - \alpha(1-\hat{d})^2 & \text{if } d = d_{gt}+1 \\ 0 & \text{otherwise} \end{cases} \quad (4)$$

where $\beta = \{1 + \alpha(\hat{d}^2 + (1-\hat{d})^2 + (1+\hat{d})^2)\}/3$

α is a set parameter, and for example, it is set to 0.2. The value of α is not limited thereto, and this value may be any value as long as it is non-negative, and p(x)>0 is satisfied.

In addition, although the adjacent classes (disparities) are the disparity $d_{gt}+1$ and the disparity $d_{gt}-1$ in the formula (4), any classes may be used as long as they are two or more adjacent classes (disparities). For example, a disparity $d_{gt}+K$ and a disparity $d_{gt}-K$ (K is an integer of 2 or higher) may be used. In addition, the number and the positions of the adjacent classes may be different between right and left.

Procedures for deriving the formula (4) will be described. A parabola curve in which an extreme value is given with the deviation d̂ is expressed by the following formula (5), where α and β are parameters for determining the shape of the curve.

$$y = -\alpha(x-\hat{d})^2 + \beta \quad (5)$$

When considering the formula (3) by setting $d_{gt}$ as the center, $d_{gt}$ is 0, $d_{gt}-1$, is $-1$, and $d_{gt}+1$ is 1. Since the dissimilarity a is a parabola function, when substituting the formula (5), it can be expressed as the following formula (6).

$$\begin{cases} \sigma(d_{gt}-1) = \sigma(-1) = -\alpha(1+\hat{d})^2 + \beta \\ \sigma(d_{gt}) = \sigma(0) = -\alpha\hat{d}^2 + \beta \\ \sigma(d_{gt}+1) = \sigma(1) = -\alpha(1-\hat{d})^2 + \beta \end{cases} \quad (6)$$

By performing normalization such that the total of weights given with the cross entropy becomes 1, the following formula (7) can be obtained.

$$-\alpha(1+\hat{d})^2 + \beta - \alpha\hat{d}^2 + \beta - \alpha(1-\hat{d})^2 + \beta = 1 \quad (7)$$

By organizing the formula (7), the following formula (8) can be obtained.

$$-\alpha(\hat{d}^2 + (1-\hat{d})^2 + (1+\hat{d})^2) + 3\beta = 1 \quad (8)$$

By organizing the formula (8) concerning β, the following formula (9) can be obtained.

$$\beta = \{1 + \alpha(\hat{d}^2 + (1-\hat{d})^2 + (1+\hat{d})^2)\}/3 \quad (9)$$

The formula (4) can be derived from the formula (9) and the formula (6).

The formula (4) satisfies the condition that the deviations d̂ obtained by substituting the weights of each of the disparity $d_{gt}$, the disparity $d_{gt}+1$, and the disparity $d_{gt}-1$ in the formula (3) are consistent. As long as this condition is satisfied, weights may be calculated by a formula other than the formula (4).

(F2) In the Case of the Equiangular Line

Figure 7:
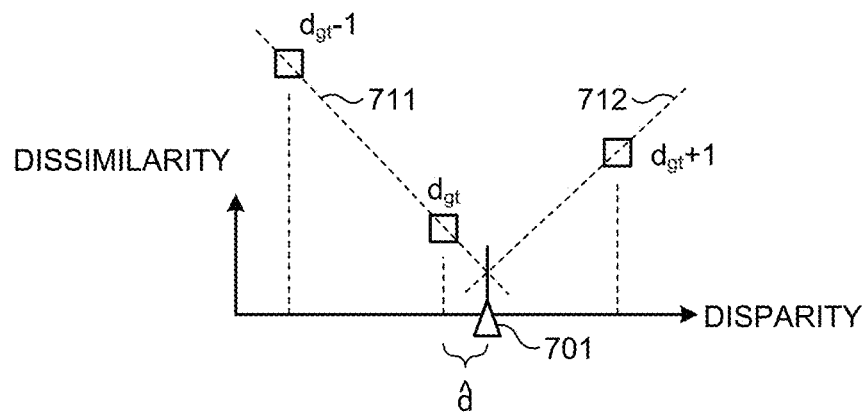
FIG. 7 is a figure illustrating an example of an equiangular line.

A case in which an equiangular line is used as a function for application will be described. FIG. 7 is a figure illustrating an example of the equiangular line, for which application is performed. As illustrated in FIG. 7, when equiangular lines 711, 712 are applied to dissimilarities of the disparity $d_{gt}$ closest to a true value 701, and the disparity $d_{gt}+1$ and the disparity $d_{gt}-1$ adjacent thereto, the true disparity is given at the minimum value of the equiangular line. In addition, the deviation d̂ from the disparity $d_{gt}$ closest to the true value 701, to the true value 701, can be obtained by the following formula (10).

$$\hat{d} = \begin{cases} \frac{\sigma(d_{gt}+1) - \sigma(d_{gt}-1)}{2(\sigma(d_{gt}) - \sigma(d_{gt}-1))} & \sigma(d_{gt}+1) < \sigma(d_{gt}-1) \\ \frac{\sigma(d_{gt}+1) - \sigma(d_{gt}-1)}{2(\sigma(d_{gt}) - \sigma(d_{gt}+1))} & \sigma(d_{gt}+1) \geq \sigma(d_{gt}-1) \end{cases} \quad (10)$$

The weight calculation unit 103 may determine a weight according to the following formula (11) as a weight that satisfies the formula (10).

$$p(x) = \begin{cases} 1-(\alpha+\beta) & \text{if } d = d_{gt}-1 \\ 1-\beta & \text{if } d = d_{gt} \\ 1-(\alpha+\gamma) & \text{if } d = d_{gt}+1 \\ 0 & \text{otherwise} \end{cases} \quad (11)$$

$$\beta = \frac{2\alpha(\hat{d}-1)+1}{3}, \gamma = 1 - 2(\alpha+\beta)$$

In this regard, procedures for deriving the formula (11) will be described. As in the case of the parabola curve, when considering setting $d_{gt}$ as the center, $d_{gt}$ is 0, $d_{gt}-1$ is $-1$, and $d_{gt}+1$ is 1. The equiangular line is expressed by the following formulas (12) and (13).

$$y = -\alpha x + \beta \quad (12)$$

$$y = \alpha x + \gamma \quad (13)$$

Since this is the equiangular line, the positive/negative of an inclination α is reversed between the formula (12) and the formula (13). Firstly, a case of $\sigma(d_{gt}+1) < \sigma(d_{gt}-1)$ will be considered. Since $d_{gt}-1$ and $d_{gt}$ are expressed by the formula (12), and $d_{gt}+1$ is expressed by the formula (13), the following formula (14) can be obtained.

$$\begin{cases} \sigma(d_{gt}-1) = \sigma(-1) = \alpha + \beta \\ \sigma(d_{gt}) = \sigma(0) = \beta \\ \sigma(d_{gt}+1) = \sigma(1) = \alpha + \gamma \end{cases} \quad (14)$$

By substituting the formula (14) in the formula (10), the following formula (15) can be obtained.

$$\hat{d} = \frac{\sigma(d_{gt}+1) - \sigma(d_{gt}+1)}{2(\sigma(d_{gt}) - \sigma(d_{gt}-1))} = \frac{\alpha+\gamma-\alpha-\beta}{2(\beta-\alpha-\beta)} = \frac{\gamma-\beta}{-2\alpha} \quad (15)$$

In addition, as in the case of the formula (7), by performing normalization such that the total of the weights becomes 1, the following formula (16) can be obtained.

$$\alpha+\beta+\beta+\alpha+\gamma=2\alpha+2\beta+\gamma=1 \quad (16)$$

The following formula (17) can be obtained from the formula (15) and the formula (16).

$$\beta \frac{2\alpha(\hat{d}-1)+1}{3}, \gamma = 1 - 2(\alpha+\beta) \quad (17)$$

The equiangular line of the formula (12) and the formula (13) is set such that the minimum value is given with the deviation d^, and the weight is also minimum at σ(0). In the cross entropy, weights closer to the true value need to be larger, and thus the equiangular line has a shape that is convex upward. Thus, in order to achieve the shape that is convex upward, a form in which subtraction is made from 1 is used in the present embodiment. In this manner, the following formula (18) is obtained.

$$\begin{cases} \sigma(d_{gt}-1) = \sigma(-1) = 1 - (\alpha+\beta) \\ \sigma(d_{gt}) = \sigma(0) = 1 - \beta \\ \sigma(d_{gt}+1) = \sigma(1) = 1 - (\alpha+\gamma) \end{cases} \quad (18)$$

The formula (11) is derived from the formula (17) and the formula (18). The formula (11) is derived with the same procedures also in the case of $\sigma(d_{gt}+1) \geq \sigma(d_{gt}-1)$.

The formula (11) satisfies the condition that the deviations d^ obtained by substituting the weights of each of the disparity $d_{gt}$, the disparity $d_{gt}+1$, and the disparity $d_{gt}-1$ in the formula (10) are consistent. As long as this condition is satisfied, weights may be calculated by a formula other than the formula (11). In addition, α is a set parameter, and it should be adjusted such that p(x) becomes non-negative, α is set to a value such as 0.1.

Since FIG. 6 and FIG. 7 illustrate an example of using dissimilarities as likelihoods, the extreme value of the parabola curve or equiangular line will be the minimum value. For example, when using a likelihood in which larger values indicate larger possibilities of belonging to a class such as similarities, the extreme value of the parabola curve or equiangular line will be the maximum value. In such case, the weight and the deviation can also be calculated by the above-described formula (3), formula (4), formula (10), and formula (11).

Although an example in which a disparity (depth) is estimated from a stereo image has been described, the same procedures as above are also applicable to estimation of a disparity from one image, and estimation of a class other than the estimation of a disparity. For example, the same procedures as above can also be applied to a case in which a class (e.g., expressed by a numerical value) having ordering is set as the target of estimation.

The class having ordering includes, for example, a class representing a movement (such as a motion vector) of an object within image data that is estimated from the image data, and a class representing an attribute (such as an age of a person) of an object (such as a person) within image data that is estimated from the image data.

For example, when estimating an age from a face image by using a neural network, classes are set at an interval of 10 years such as 0 year old, 10 years old, . . . . If the true value is a sub-class such as 12 years old, by applying a function having a predetermined shape (such as a parabola curve or equiangular line) to dissimilarities of three classes, 0 year old, 10 years old, and 20 years old, weights of the three classes are set such that the extreme value of the dissimilarities becomes 12 years old. By forming a loss function of the neural network using these weights, and back-propagating a loss calculated from this loss function, the neural network is learned.

When estimating a motion vector expressed in two dimensions, a likelihood is expressed in two dimensions. In such case, the same procedures as above can also be applied by, for example, applying the likelihood expressed in two dimensions to a function having a predetermined shape.

In this manner, in the learning device according to the first embodiment, the estimation model is learned such that a class can be estimated in sub-class units. By doing so, a sub-class can be estimated by using the learned estimation model. That is to say, a class can be estimated with high accuracy.

Second Embodiment

In a second embodiment, an estimating system including the estimating device, which estimates a class by using an estimation model learned with the learning device 100 according to the first embodiment, is described.

Figure 8:
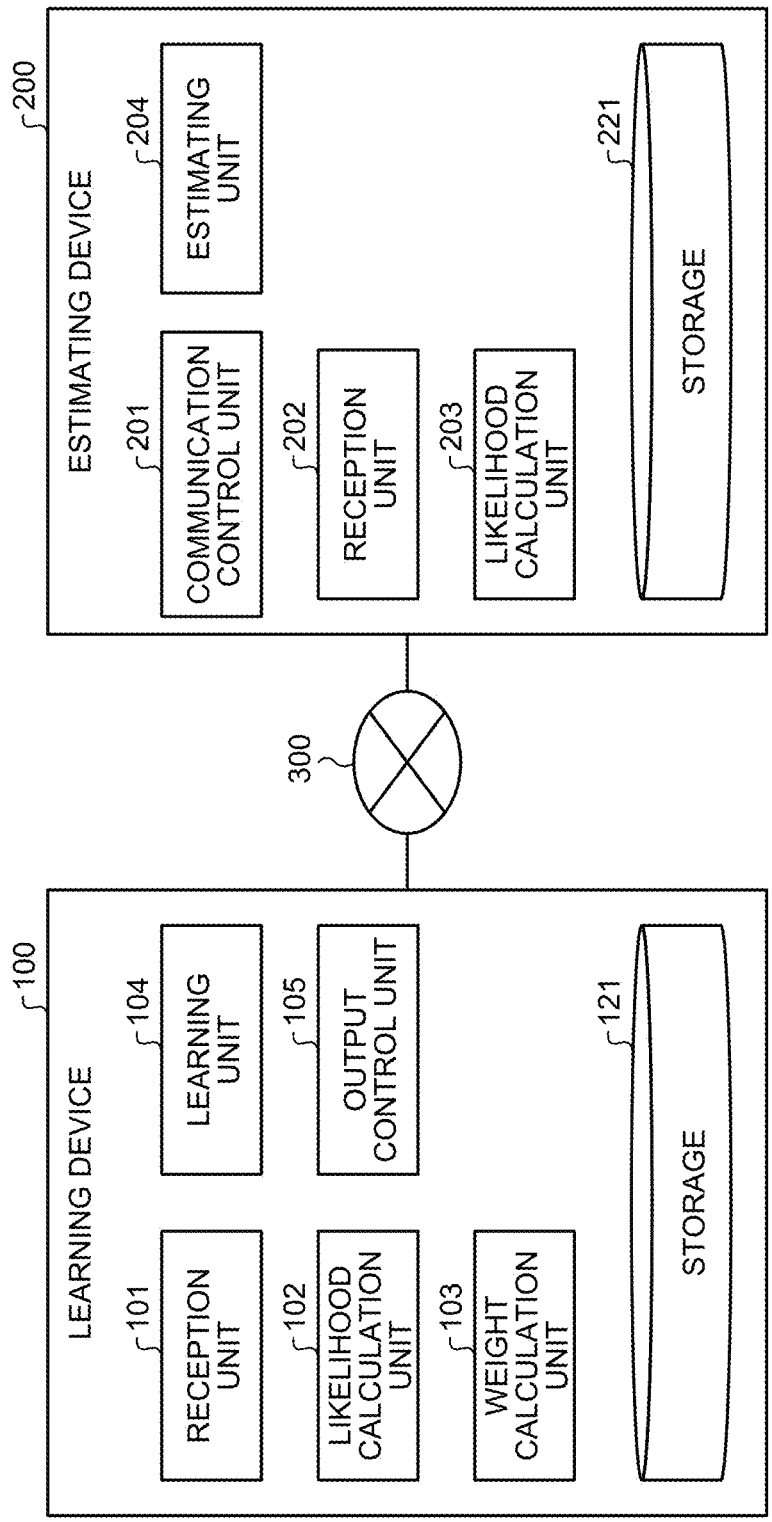
FIG. 8 is a block diagram of an estimating system according to a second embodiment.

FIG. 8 is a block diagram illustrating an example of a configuration of the estimating system according to the second embodiment. As illustrated in FIG. 8, the estimating system is configured such that the learning device 100 and an estimating device 200 are connected with a network 300.

Although the network 300 is the Internet or the like, it may be a network in any other form. For example, the network 300 may be either a wired network or a wireless network.

Since the learning device 100 includes the same functions as the first embodiment, the same reference signs are provided, and explanations thereof are omitted.

The estimating device 200 includes a communication control unit 201, a reception unit 202, a likelihood calculation unit 203 (second likelihood calculation unit), an estimating unit 204, and storage 221.

The storage 221 stores therein various kinds of data to be used for various kinds of processing executed in the estimating device 200. For example, the storage 221 stores therein parameters of an estimation model transmitted from the learning device 100. The storage 221 can be made of various storage media that are generally available such as flash memory, memory cards, RAM, HDD, and optical disks.

The communication control unit 201 controls communication with an external device such as the learning device 100. For example, the communication control unit 201 receives, from the learning device 100, information on the parameters defining the learned estimation model and the like.

The reception unit 202 receives inputs of various kinds of data to be used for various kinds of processing by the estimating device 200. For example, the reception unit 202 receives an input of input data that becomes the target of estimation processing. When estimating a disparity class (depth class) from a stereo image, the reception unit 103 receives an input of, for example, a stereo image.

By using the estimation model stored in the storage 221, the likelihood calculation unit 203 calculates a likelihood (e.g., dissimilarities) belonging to a plurality of estimated classes, of the input data, for each of the estimated classes.

The estimating unit 204 estimates the class of the input data using the calculated likelihood. More specifically, the estimating unit 204 applies a likelihood of a class (fourth class) having the largest likelihood among the estimated classes and likelihoods of two or more classes (fifth class and sixth class) adjacent to this class, to a function having a predetermined shape, and estimates a class or sub-class corresponding to a position that has an extreme value of the function as the class of the input data. When using dissimilarities as the likelihoods, the largest likelihood corresponds to the smallest dissimilarity. Details of the estimation processing will be described below.

The configuration of the estimating system illustrated in FIG. 8 is an example, and the configuration is not limited thereto. For example, the estimating system may be configured such that the respective units of the estimating device 200 and the respective units of the learning device 100 are included within one device (estimating device). In this case, functions that can be commonalized (e.g., the reception unit 101, the reception unit 202, the likelihood calculation unit 102, the likelihood calculation unit 203, the storage 121, and the storage 221) may be commonalized. In addition, the estimating device 200 may be physically configured with one device, or it may be physically configured with a plurality of devices. For example, the estimating device 200 may be constructed in a cloud environment.

Figure 9:
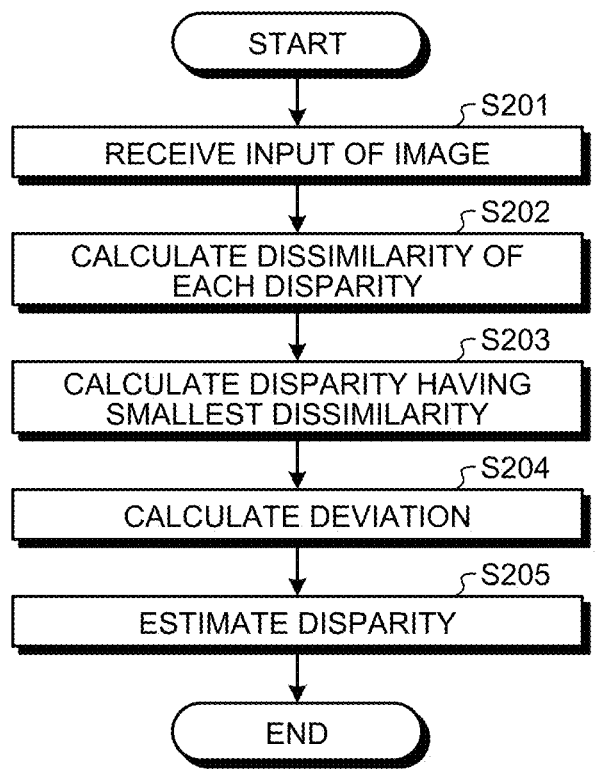
FIG. 9 is a flow chart of estimation processing according to the second embodiment.

The following describes the estimation processing by the estimating device 200 according to the second embodiment configured in such manner with reference to FIG. 9. FIG. 9 is a flow chart illustrating an example of the estimation processing according to the second embodiment. Although the second embodiment is explained with an example of disparity estimation from a stereo image as in the case of the first embodiment, an applicable class is not limited to a disparity class. In addition, parameters of the estimation model learned in the learning device 100 are stored in the storage 221 before the estimation processing to allow its use in the estimation processing.

The reception unit 202 receives an input of a stereo image (Step S201). Since learning of a neural network is unnecessary in the second embodiment, a true value is not input.

Then, the likelihood calculation unit 203 calculates dissimilarities with respect to the input stereo image by using the parameters of the estimation model (e.g., a neural network) stored in the storage 221 (Step S202). With this processing, dissimilarities are obtained for each of predetermined disparity classes (number of disparities), with respect to each pixel within the image.

Then, the estimating unit 204 calculates a disparity $d_*$ in which the dissimilarity becomes the smallest (in the case of similarities, a disparity in which the similarity becomes the largest), for each pixel within the image (Step S203). The estimating unit 204 calculates the disparity $d_*$ by using, for example, the following formula (19).

$$d_* = \arg \min_x \sigma(x) \quad (19)$$

Furthermore, the estimating unit 204 specifies disparities $d_*+1$ and $d_*-1$ adjacent to $d_*$. The disparities to be specified do not have to be the disparities $d_{gt}\pm 1$, which are next to $d_*$, as long as they are at least two or more adjacent disparities.

The estimating unit 204 uses dissimilarities of a total of three disparities, which are the disparity $d_*$ with the smallest dissimilarity, and two adjacent disparities, for application to a function having a predetermined shape, and calculates a deviation $\hat{d}$ corresponding to a position that has an extreme value of the function (Step S204). The function having the predetermined shape is either the above-described (F1) parabola curve or (F2) equiangular line, and the same function as that at the time of learning the neural network is used.

In the case of the (F1) parabola curve, the estimating unit 204 substitutes a dissimilarity σ in the formula (3), and calculates the deviation $\hat{d}$. In the case of the (F2) equiangular line, the estimating unit 204 substitutes the dissimilarity σ in the formula (10), and calculates the deviation $\hat{d}$.

Then, the estimating unit 204 uses the calculated deviation $\hat{d}$ to estimate a disparity in sub-class units (sub-pixel disparity) (Step S205). From the formula (3) or the formula (10), the deviation $\hat{d}$ is estimated in the range of −0.5 to 0.5. When the adjacent disparity is one pixel, i.e., the disparity classes are defined in one pixel unit, the calculated deviation $\hat{d}$ can be used as it is. When the disparity classes are defined in N pixel (N is an integer of 2 or higher) units, the calculated deviation $\hat{d}$ can be used by multiplying this by N times.

The estimating unit 204 calculates a sub-pixel disparity D by adding the calculated disparity $d_*$ and the deviation $\hat{d}$ as shown in the following formula (20).

$$D = d_* + \hat{d} \quad (20)$$

FIG. 10 is a figure illustrating an example of an estimated result of a disparity from a stereo image. An image 1001 shows an example of an input image. Images 1002 to 1008 show examples of a disparity image. The disparity image can be expressed as, for example, an image indicating the level of a disparity by colors. For example, the image may have a color closer to a warm color as the disparity becomes larger (near), and a color closer to a blue color as the disparity becomes smaller (far). Since the distance continuously changes in a road or the like, the color is continuously changed from the near side to the distant side.

The image 1002 is an example of a disparity image showing the true value of a disparity. The image 1004 shows an example of a disparity image in which a disparity having the smallest dissimilarity is calculated for each pixel with a neural network that is learned using a cross entropy loss, and visualization is performed depending on the level of the disparity. The image 1003 shews an example of a disparity image in which sub-pixel disparities are visualized by calculating deviations with the sane method as in Step S204 with respect to disparities calculated in the sane manner as in the image 1004, and estimating the sub-pixel disparities with the same method as in Step S205.

In both of the images 1003 and 1004, the colors are not continuously changed, and thus estimation of discrete disparities can be confirmed. This is because, in the cross entropy loss, the weight of a loss is not set in consideration of sub-classes at the time of learning the neural network.

Images 1006 and 1005 show examples of disparity images obtained by applying the same kinds of processing as the images 1004 and 1003, respectively, by using a soft cross entropy loss as the loss function instead of the cross entropy loss. As shown in the image 1005, also regarding the soft cross entropy loss, sub-classes are not correctly estimated by only applying the same methods as in Step S204 and Step S205.

An image 1008 shows an example of a disparity image in which a disparity having the smallest dissimilarity is calculated for each pixel using the neural network learned with the method of the present embodiment, and visualization is performed depending on the level of the disparity. An image 1007 shows an example of a disparity image in which sub-pixel disparities are visualized by further calculating a deviation with the method shown in Step S204, and estimating the sub-pixel disparities with the method shown in Step S205.

As shown in the image 1008, when not executing the processing (Step S204, Step S205) of estimating sub-pixel disparities by application to a function, only discrete classes are estimated, and the disparities are discontinuously changed. In contrast, as shown in the image 1007, when executing the processing of estimating sub-pixel disparities by application to a function, the disparities are continuously changed, and a value close to the true value can be estimated.

In this manner, in the estimating device according to the second embodiment, a class of input data can be estimated in sub-class units by using the estimation model, which is learned so as to enable estimation of a class in sub-class units.

As described above, according to the first embodiment to the second embodiment, a class can be estimated with higher accuracy by learning the estimation model so as to enable estimation of a class in sub-class units.

Figure 11:
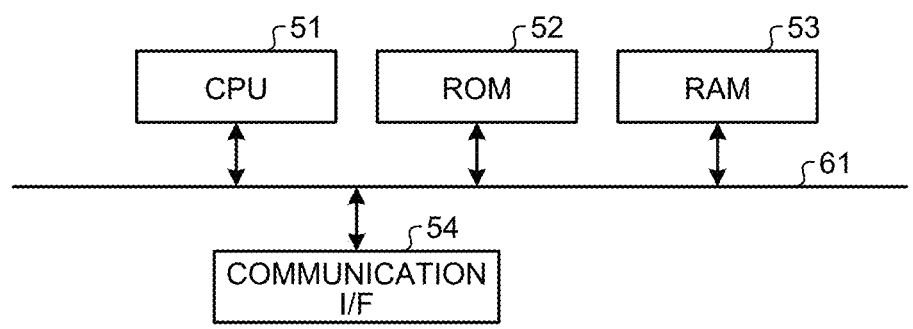
FIG. 11 is a hardware configuration diagram of devices according to the first or the second embodiment.

Hardware configurations of the devices (the learning device and the estimating device) according to the first or the second embodiment will now be described using FIG. 11. FIG. 11 is an explanatory chart illustrating a hardware configuration example of the devices according to the first or the second embodiment.

The devices according to the first or the second embodiment include a control device such as a CPU 51, storage devices such as read only memory (ROM) 52 and random access memory (RAM) 53, a communication I/F 54 for performing communication by connecting to a network, and a bus 61 for connecting the respective units.

A computer program to be executed in the devices according to the first or the second embodiment is provided by incorporation beforehand into the ROM 52 and the like.

The computer program to be executed in the devices according to the first or the second embodiment may be configured such that it is provided as a computer program product by being recorded on a computer readable recording medium such as compact disc read only memory (CD-ROM), a flexible disk (FD), a compact disc recordable (CD-R), or a digital versatile disc (DVD), as a file in an installable form or executable form.

Furthermore, the computer program to be executed in the devices according to the first or the second embodiment may be configured such that it is provided by being stored on a computer connected to a network such as the Internet, and downloaded via a network. In addition, the computer program to be executed in the devices according to the first or the second embodiment may be configured such that it is provided or distributed via a network such as the Internet.

The computer program to be executed in the devices according to the first or the second embodiment may cause a computer to function as the respective units of the above-described devices. In this computer, the CPU 51 can read the computer program from a computer readable storage medium to a main memory device, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device, comprising:
one or more processors configured to:
calculate a likelihood of input data belonging to a plurality of classes of learning data by using an estimation model to estimate which of the estimated classes the input data belongs;
calculate a weight of a loss function to be used in learning the estimation model such that, when a likelihood of a first class that is closer to the input data than other estimated classes among the estimated classes and likelihoods of a second class and a third class that are adjacent to the first class are applied to a function comprising a particular shape function, a position that is a minimum value or maximum value of the particular shape function corresponds to the input data; and
learn the estimation model by using the loss function.

2. The learning device according to claim 1, wherein the particular shape is a parabola curve shape function or an equiangular line shape function.

3. The learning device according to claim 1, wherein the estimated classes are a class representing a disparity estimated from image data, a class representing a movement of an object within image data estimated from the image data, or a class representing an attribute of an object within image data estimated from the image data.

4. The learning device according to claim 1, wherein the estimation model is a neural network model.

5. An estimating device, comprising:
the one or more processors configured to:
calculate a likelihood of the data belonging to the estimated classes by using the estimation model learned with the learning device according to claim 1; and
estimate, when a likelihood of a fourth class in which the likelihood becomes largest among the estimated classes, and likelihoods of a fifth class and a sixth class that are adjacent to the fourth class are applied to the function, a class corresponding to a second position that has an extreme value of the function.

6. A learning method, comprising:
calculating a likelihood of input data belonging to a plurality of classes of learning data, by using an estimation model to estimate which of the estimated classes the data belongs;
calculating a weight of a loss function to be used in learning the estimation model, such that when a likelihood of a first class that is closer to the input data than other estimated classes among the estimated classes, and likelihoods of a second class and a third class that are adjacent to the first class are applied to a function comprising a particular shape function, a position that is a minimum value or maximum value of the particular shape function corresponds to the input data; and
learning the estimation model by using the loss function.

7. The learning method according to claim 6, wherein the particular shape function comprises a parabola curve shape function or an equiangular line shape function.

8. The learning method according to claim 6, wherein the estimated classes are a class representing a disparity estimated from image data, a class representing a movement of an object within image data estimated from the image data, or a class representing an attribute of an object within image data estimated from the image data.

9. The learning method according to claim 6, wherein the estimation model is a neural network model.

10. A computer program product comprising a non-transitory computer readable medium comprising programmed instructions, wherein the instructions, when executed by a computer, cause the computer to perform:
   calculating a likelihood of input data belonging to a plurality of classes of learning data, by using an estimation model to estimate which of the estimated classes the input data belongs;
   calculating a weight of a loss function to be used in learning the estimation model such that, when a likelihood of a first class that is closer to the input data than other estimated classes among the estimated classes and likelihoods of a second class and a third class that are adjacent to the first class are applied to a function comprising a particular shape function, a position that is a minimum value or maximum value of the particular shape function corresponds to the input data; and
   learning the estimation model by using the loss function.

11. The computer program product according to claim 10, wherein the particular shape function comprises a parabola curve shape function or an equiangular line shape function.

12. The computer program product according to claim 10, wherein the estimated classes are a class representing a disparity estimated from image data, a class representing a movement of an object within image data estimated from the image data, or a class representing an attribute of an object within image data estimated from the image data.

13. The computer program product according to claim 10, wherein the estimation model is a neural network model.

\* \* \* \* \*